(12) United States Patent
Knutson

(10) Patent No.: US 9,313,687 B2
(45) Date of Patent: Apr. 12, 2016

(54) REDUCING CORE NETWORK TRAFFIC CAUSED BY MIGRANT USERS

(71) Applicant: THOMSON LICENSING, Issy de Moulineaux (FR)

(72) Inventor: Paul Gothard Knutson, Westfield, IN (US)

(73) Assignee: THOMSON LICENSING, Issy les-Moulineaux (FR)

( * ) Notice: Subject to any disclaimer, the term of this patent is extended or adjusted under 35 U.S.C. 154(b) by 0 days.

(21) Appl. No.: 14/424,548

(22) PCT Filed: Sep. 25, 2012

(86) PCT No.: PCT/US2012/057008
§ 371 (c)(1),
(2) Date: Feb. 27, 2015

(87) PCT Pub. No.: WO2014/051535
PCT Pub. Date: Apr. 3, 2014

(65) Prior Publication Data
US 2015/0237527 A1    Aug. 20, 2015

(51) Int. Cl.
*H04L 29/06* (2006.01)
*H04W 28/02* (2009.01)
*H04L 29/12* (2006.01)
*H04L 29/08* (2006.01)
*H04W 12/08* (2009.01)

(52) U.S. Cl.
CPC ....... *H04W 28/0289* (2013.01); *H04L 61/2015* (2013.01); *H04L 63/0892* (2013.01); *H04L 63/1458* (2013.01); *H04L 67/02* (2013.01); *H04W 12/08* (2013.01); *H04L 61/6022* (2013.01)

(58) Field of Classification Search
USPC ............................................................. 726/4
See application file for complete search history.

(56) References Cited

U.S. PATENT DOCUMENTS

| | | | |
|---|---|---|---|
| 2007/0203999 A1* | 8/2007 | Townsley | H04L 29/1282 709/207 |
| 2008/0046597 A1* | 2/2008 | Stademann | H04L 12/2856 709/249 |
| 2008/0109559 A1* | 5/2008 | Chhabra | H04L 12/2856 709/238 |

(Continued)

FOREIGN PATENT DOCUMENTS

| | | |
|---|---|---|
| EP | 1523129 | 4/2005 |
| EP | 2437557 | 4/2012 |
| WO | WO2012001364 | 1/2012 |

*Primary Examiner* — Jason Lee
(74) *Attorney, Agent, or Firm* — Robert D. Shedd; Catherine A. Cooper

(57) ABSTRACT

A method and apparatus for reducing core network traffic caused by migrant users of a public wireless network are described including receiving a DHCP discover request from a wireless client device, determining if there are enough IP addresses available to assign one of the plurality of IP addresses to the wireless client device, transmitting a DHCP acknowledgement including the assigned IP address and a lease duration to the wireless client device, determining if a lease timeout has occurred, releasing the assigned IP address if the lease timeout has occurred, receiving a first hypertext transfer protocol (HTTP) request or first hypertext transfer protocol secure (HTTPS) request from the wireless client device, transmitting a media access control (MAC) pre-authentication request from the wireless client to an authentication, authorization and accounting (AAA) server, receiving a MAC pre-authentication response from the AAA server and providing access to the Internet via the wireless client device.

9 Claims, 15 Drawing Sheets

(56) References Cited

U.S. PATENT DOCUMENTS

2011/0106947 A1    5/2011   Lin  
2012/0260321 A1*   10/2012   Wendt ................... H04L 9/0863  
                                                                                       726/5  
2014/0373138 A1*   12/2014   Park ....................... H04L 63/08  
                                                                                       726/22

* cited by examiner

To Fig. 6(Continued)

REDUCING CORE NETWORK TRAFFIC CAUSED BY MIGRANT USERS

This application claims the benefit, under 35 U.S.C. §365 of International Application PCT/US12/057008, filed Sep. 25, 2012, which was published in accordance with PCT Article 21(2) on Apr. 3, 2014 in English.

FIELD OF THE INVENTION

The present invention relates to public wireless networks and, in particular, to a method for reducing core traffic caused by migrant users of a public WiFi network.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

The present invention reduces the demands on the authentication servers in a subscription public WiFi service. Anticipating no activity from the majority of potential users, the access points for the network readily issue IP addresses, and only begin the authentication process after the user attempts to access the core network. If an access point is heavily used, so that it is running out of IP addresses, the access point will bypass this service, and start authenticating all users, to reduce the possibility of denial of service attacks. In conventional methods, migrant users were allowed to frequently bother the core network causing substantial core traffic.

The present invention will become increasingly important as IEEE 802.11ac and IEEE 802.11 ad are rolled out.

SUMMARY OF THE INVENTION

The present invention provides a means to reduce core traffic caused by "migrant users" of a public WiFi network. Public hotspots operate as temporary DHCP servers, providing users an IP address—until the users begin attempting access of and to the core network. In the present invention, only when the user tries to access the core network does the authentication process actually begin. If a user passing through a hotspot does not access the core network, then the user will just receive an IP address from the access point, and not touch the core network. If the user attempts to connect to the core network, the authentication process will be initiated. In the event of too many users, the access point (AP) will resume the core network based authentication process to prevent a denial of service attack.

A method and apparatus for reducing core network traffic caused by migrant users of a public wireless network are described including receiving a plurality of internet protocol addresses from a dynamic host configuration protocol server, storing the received plurality of IP addresses, receiving a DHCP discover request from a wireless client device, determining if there are enough IP addresses available to assign one of the plurality of IP addresses to the wireless client device, transmitting a DHCP acknowledgement including the assigned IP address and a lease duration to the wireless client device, determining if a lease timeout has occurred, releasing the assigned IP address if the lease timeout has occurred, receiving a first hypertext transfer protocol (HTTP) request or first hypertext transfer protocol secure (HTTPS) request from the wireless client device, transmitting a media access control (MAC) pre-authentication request from the wireless client to an authentication, authorization and accounting (AAA) server, receiving a MAC pre-authentication response from the AAA server and providing access to the Internet via the wireless client device.

Also described are a method and apparatus for reducing core network traffic caused by migrant users of a public wireless network including receiving a plurality of internet protocol (IP) addresses from a dynamic host configuration protocol (DHCP) server, storing the received plurality of IP addresses, receiving a DHCP discover request from a wireless client device, determining if there are enough IP addresses available to assign one of the plurality of IP addresses to the wireless client device, transmitting a DHCP acknowledgement including the assigned IP address and a lease duration to the wireless client device, determining if a lease timeout has occurred, releasing the assigned IP address if the lease timeout has occurred, receiving a first hypertext transfer protocol (HTTP) request or a first hypertext transfer protocol secure (HTTPS) request from the wireless client device, transmitting a media access control (MAC) pre-authentication request from the wireless client to an authentication, authorization and accounting (AAA) server, receiving a MAC pre-authentication response from the AAA server and providing access to the Internet via the wireless client device.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

The key to the present invention is allowing the access point or gateway at the edge of the core network to issue IP addresses to users in advance of their being authenticated by the network. The authentication process is then allowed to proceed at a leisurely rate either when the required servers and network paths indicate the ability to perform the authentication, or when forced by the client trying to access the core network. Migrant users, would be satisfied by the issuance of the IP address, and if they did not need to access the network, they would not burden the network. This is particularly useful in the case of WiFi enabled cell phones being carried through the service area of a subscription WiFi carrier.

It is useful to point out that a user or client device is a device with which a user wants to access the Internet or other network services and may be a computer, laptop, personal digital assistant (PDA), dual mode smart phone, iPod, iPad, tablet or any other processing device having input, output, a display and storage and capable of communication (interaction) with the Internet and/or other users. A user device (client device) may or may not include a printing capability. A user or client device may be wired line or wireless (mobile).

This is illustrated in the context of a Home Hotspot Gateway (HHG) scenario. Here, home WiFi systems are also enabled as public hotspots for WiFi service. The potential for large numbers of transient connections is possible in this scenario, and this invention would limit the core network exposure to these connections.

Figure 1:
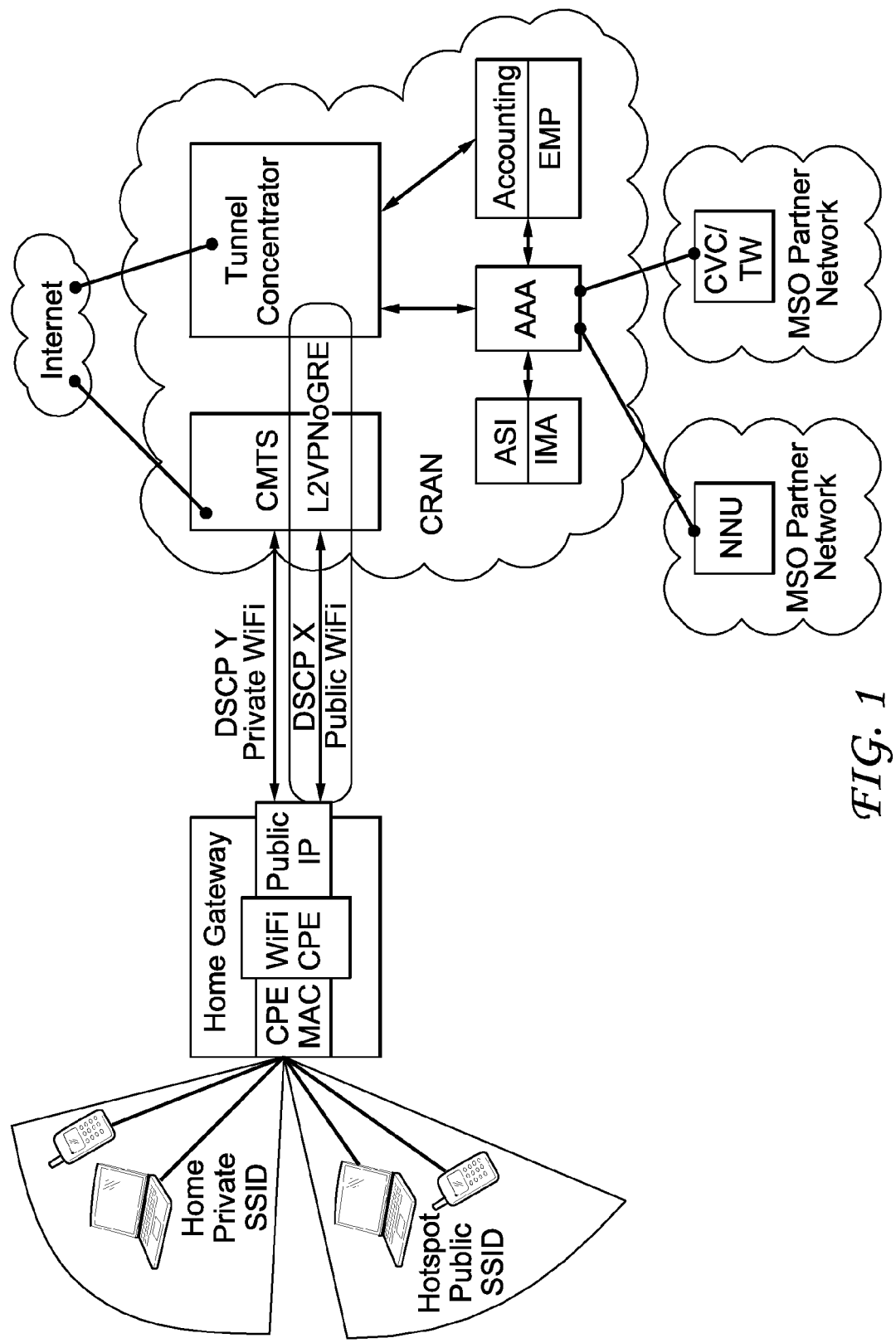
FIG. 1 is a conventional generic routing encapsulation (GRE) based home hotspot architecture.

FIG. 1 shows the architecture if the HHG system, the WLAN Gateway being located at the end of the GRE tunnel A public or private user request (request from a user's mobile device) is received by customer premises equipment (CPE) Media Access Control (MAC) layer of the protocol stack, which is part of the WiFi CPE. Using the Internet Protocol (IP) layer of the protocol stack a private request is forwarded (transmitted) to the cable modem termination system for transmission (forwarding) to the Internet. A CMTS is a piece of equipment typically located in a cable company's headend or hubsite. A CMTS (Cable Modem Termination System) is used to provide high speed data services, such as cable Internet or voice over Internet Protocol, to cable subscribers. A CMTS provides many of the same functions provided by the Digital Subscriber Line Access Multiplexer (DSLAM) in a Digital Subscriber Line (DSL) system. A DSLAM is a network device, often located in the telephone exchanges of the telecommunications operators. It connects multiple customer DSL interfaces to a high-speed digital communications channel using multiplexing techniques. The CMTS responds to the private user request. A public user request such as through xfinitywifi is forwarded to the tunnel concentrator by the CMTS. The pipe (channel, link) between the CMTS and the tunnel concentrator is a L2VPNoGRE, which is a Layer 2 Virtual Private Network over GRE. The IMA is an Identity Management Architecture processing system. The IMA can be used for enterprise or cross-network identity management. Identity management describes the management of individual identities, their authentication, authorization, roles, and privileges within or across system and enterprise boundaries with the goal of increasing security. The IMA system queries the customers' records on the Anonymous Subscriber Information (ASI) system, which is used to authenticate and authorize users (WiFi client, user device, client device). The IMA and the ASI are in communication with each other. The Enhanced Mediation Platform (EMP) and the Accounting system are also in communication the Authentication, Authorization and Accounting (AAA) server and the tunnel concentrator. The AAA server also facilitates service for partner Media Service Operators. For example, the NetNearU (NNU), CableVision, and Time Warner (CVC/TW) systems are in communication with the AAA server to provide MSO partner services. The CMTS, tunnel concentrator, IMA, ASI, AAA server, EMP and accounting systems are all part of the Converged Regional Area Network (CRAN).

Figure 2:
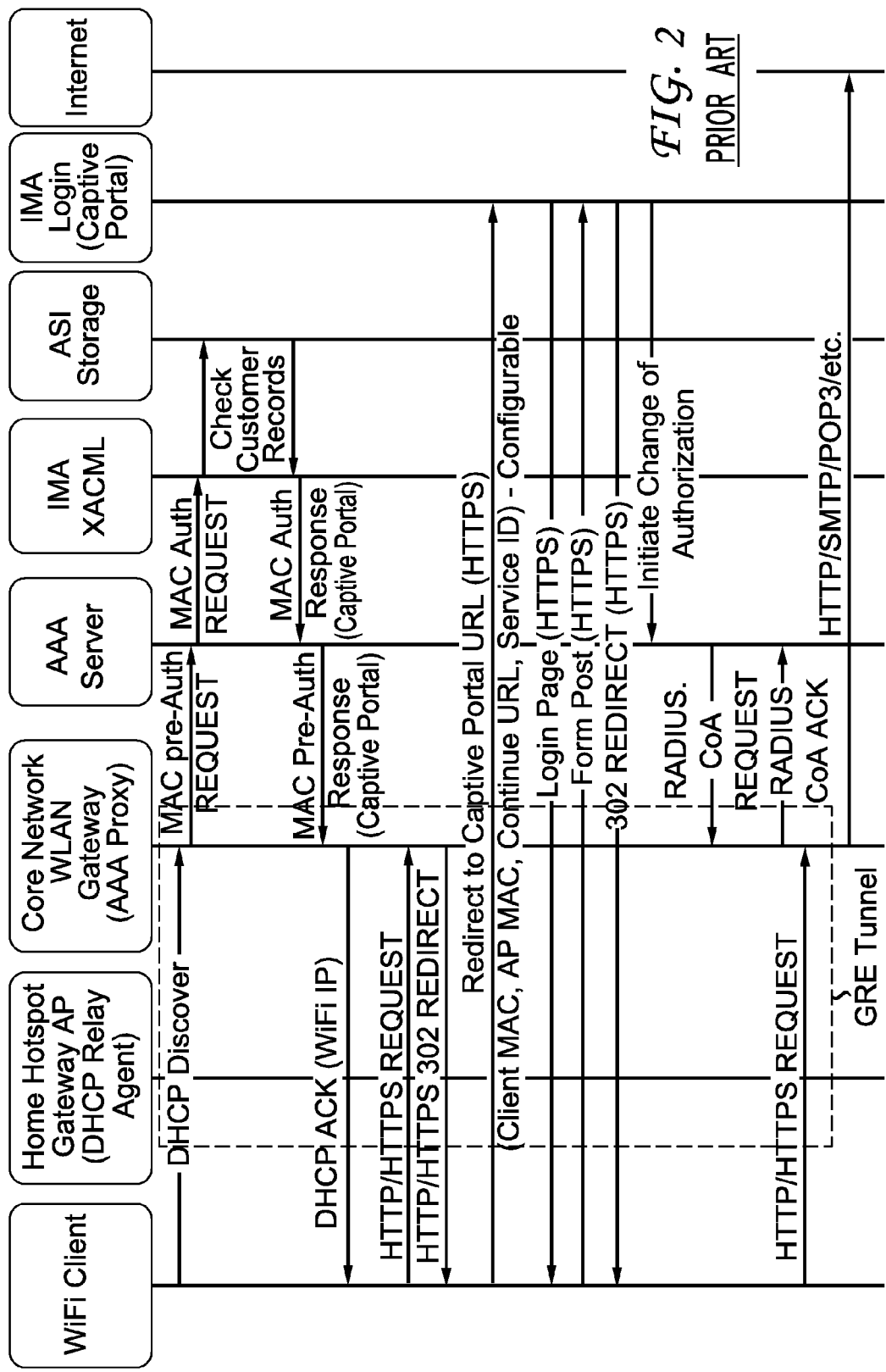
FIG. 2 shows the first time authentication in a conventional home hotspot gateway (HHG).
Figure 3:
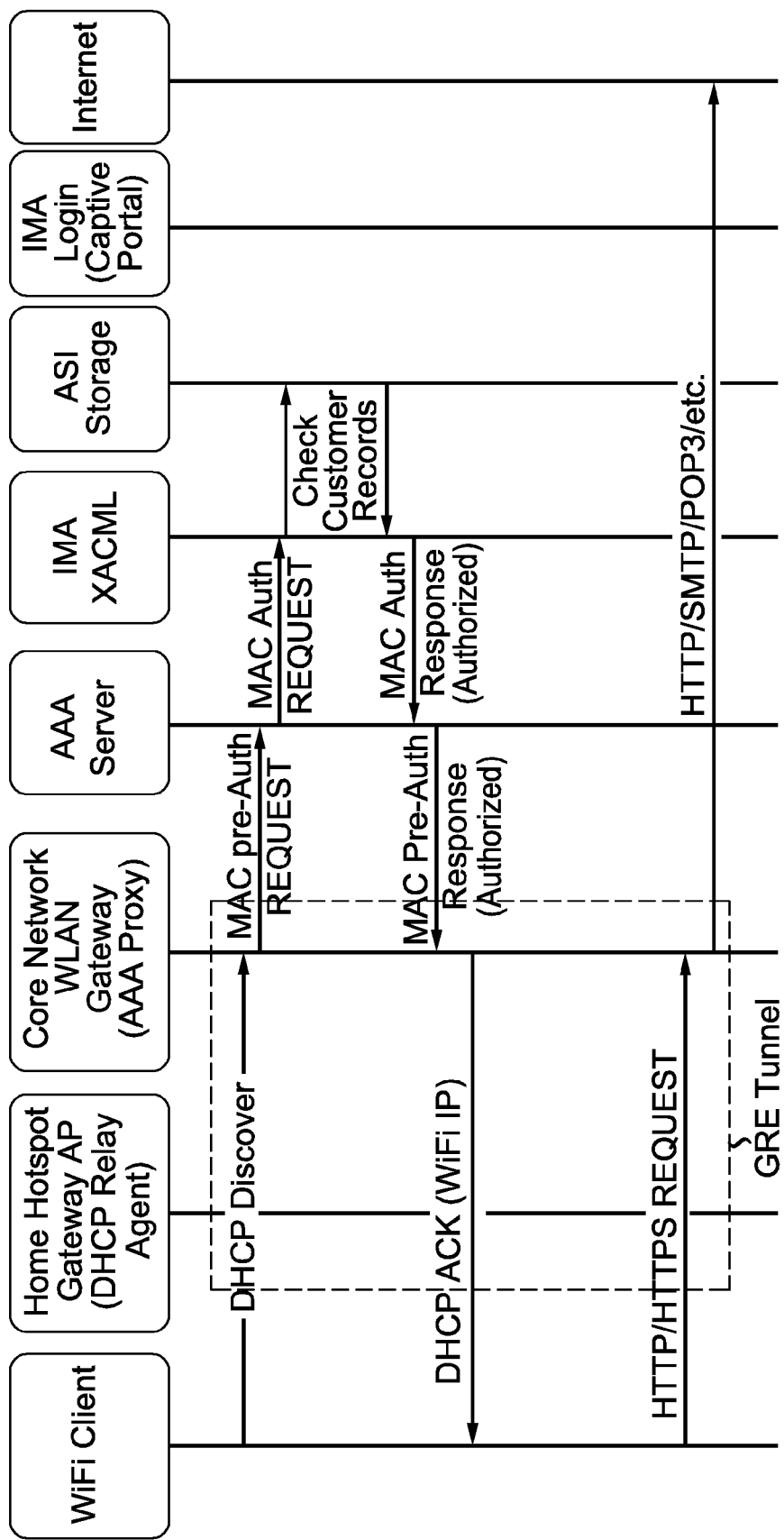
FIG. 3 shows subsequent user authentication in a conventional home hotspot gateway (HHG).

FIGS. 2 and 3 illustrate the authentication flow in a conventional HHG system. The advantage of this approach is that only authenticated users are issued IP addresses on the network.

FIG. 2 shows the first time authentication in a conventional home hotspot gateway (HHG). The WiFi client (user device, client device) Dynamic Host Configuration Protocol (DHCP) discover request (user request) is transmitted (sent, forwarded) through the HHG to the WLAN Gateway (GW) via a GRE tunnel. The DHCP discover request is a message broadcast on the physical subnet by a mobile user device to locate available DHCP servers. The DHCP request may include optional information such as vendor class identifier, which allows the DHCP server to differentiate among hardware types and functionality that may be required. Such information may also give the DHCP server about any extra information that the WiFi client may need in a DHCP response. The WLAN GW acts as a proxy for the AAA server and forwards (transmits, sends) a MAC pre-authentication request to the AAA server. The AAA server forwards (transmits, sends) a MAC authentication request to the IMA eXtensible Markup Language (X) Access Control Markup Language (XACML). XACML is a markup language optimized for access control. The IMA system is for access control, which uses XACML. The IMA XACML forwards (transmits, sends) a request to the ASI to check customer records. The ASI responds (replies) to the IMA XACML. The IMA XACML sends (transmits, forwards) a MAC authentication response to the AAA server over a captive portal. The AAA server sends (transmits, forwards) a MAC pre-authentication response to the WLAN GW over a captive portal. The WLAN GW responds to the user device (client device) through the GRE tunnel with a DHCP ACK. The user device (client device) then sends a HTTP/HTTPS request to the WLAN GW via the GRE tunnel. The WLAN GW responds with a HTTP/HTTPS 302 redirect. 302 Redirect is a temporary redirect, insinuating that the original URL will be re-established in the near future, so keep checking it. The user device (client device) is redirected to a captive portal URL (HTTPS). Using a captive portal forces the user device (client device) to see a special web page for authentication purposes before using the Internet normally. The web page to which the user device (client device) is redirected is configurable. The user device (client device) is redirected to the IMA login captive portal. The login page is displayed at the user device (client device). The user device responds by form post to the IMA login page. Form post is transmission of information (data) via HTTP(S). The form post includes data (information) such as user identification (user id) and password. This may be entered manually by the user or automatically by the user device (client device, WiFi client). The IMA login page responds by with a 302 redirect (HTTPS) to the user device (client device). The 302 redirect (HTTPS) is sent to the user device upon authentication of the user device (client device). The IMA login page then initiates a Change of Authorization (CoA) to the AAA server. The AAA server sends (forwards, transmits) a Remote Authentication Dial In User Service (RADIUS) CoA request to the WLAN GW. RADIUS is a networking protocol that provides AAA management for client devices (user devices) to access and use network services. The WLAN GW responds to the AAA server with a RADIUS CoA ACK. The user device (client device) sends (transmits, forwards) a HTTP/HTTPS request to the WLAN GW via the GRE tunnel. The WLAN GW forwards (transmits, sends) the request (message) to the Internet (since the user device has been authenticated). At this point, the user has access to the internet, and he/she can use standard internet protocols and applications, such as HTTP, SMTP, POP3, and others. SMTP is Simple Mail Transfer Protocol and is an Internet standard for email transmission across IP networks. POP3 is Post Office Protocol 3 (POP3) is an application-layer Internet standard protocol used by local e-mail clients to retrieve e-mail from a remote server over a TCP/IP connection.

FIG. 3 shows subsequent user authentication in a conventional home hotspot gateway (HHG). A WiFi client (user device, client device) which has been previously authenticated sends (transmits, forwards) a DHCP discover request to the WLAN GW via the GRE tunnel. The WLAN GW sends (transmits, forwards) a MAC pre-authentication request to the AAA server. The AAA server forwards (transmits, sends) a MAC authentication request to the IMA XACML. The IMA XACML forwards (transmits, sends) a request to the ASI to check customer records. The ASI responds (replies) to the IMA XACML indicating that the device with this MAC is authorized for access. The IMA XACML sends (transmits, forwards a MAC authentication response to the AAA server over a captive portal. The AAA server sends (transmits, forwards) a MAC pre-authentication response to the WLAN GW over a captive portal. The WLAN GW responds to the user device (client device) through the GRE tunnel with a DHCP ACK. The user device (client device) then sends a HTTP/HTTPS request to the WLAN GW via the GRE tunnel Having been authorized to access the network, the WLAN GW forwards (sends, transmits) the HTTP/SMTP/POP3 or other request (message) to the Internet. As can be seen if the user device has been previously authenticated the redirection in order to authenticate the user portion of FIG. 1 is omitted.

Figure 4:
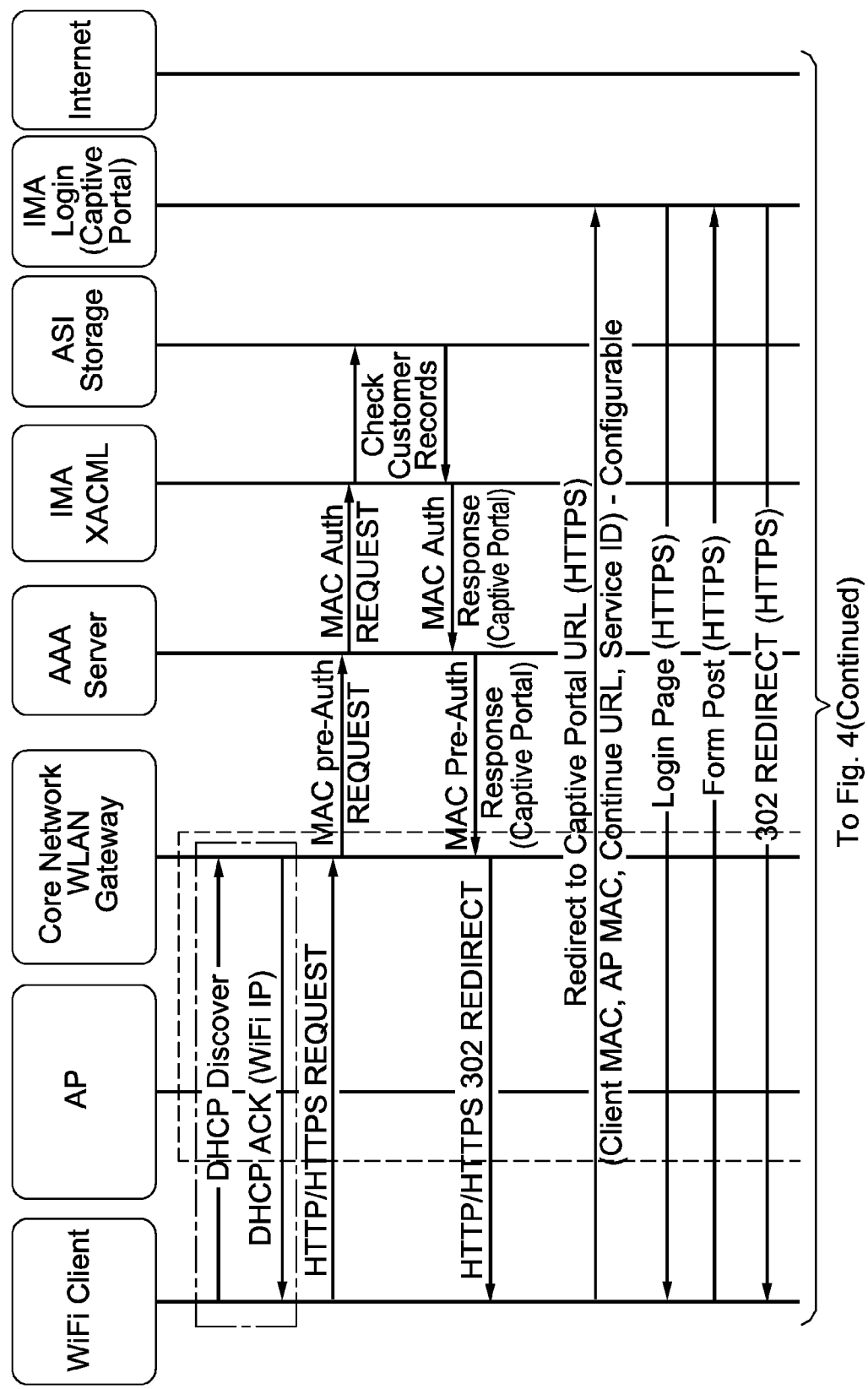
FIG. 4 shows first time user authentication with a fully GRE tunneled system in accordance with the principles of the present invention.
Figure 4:
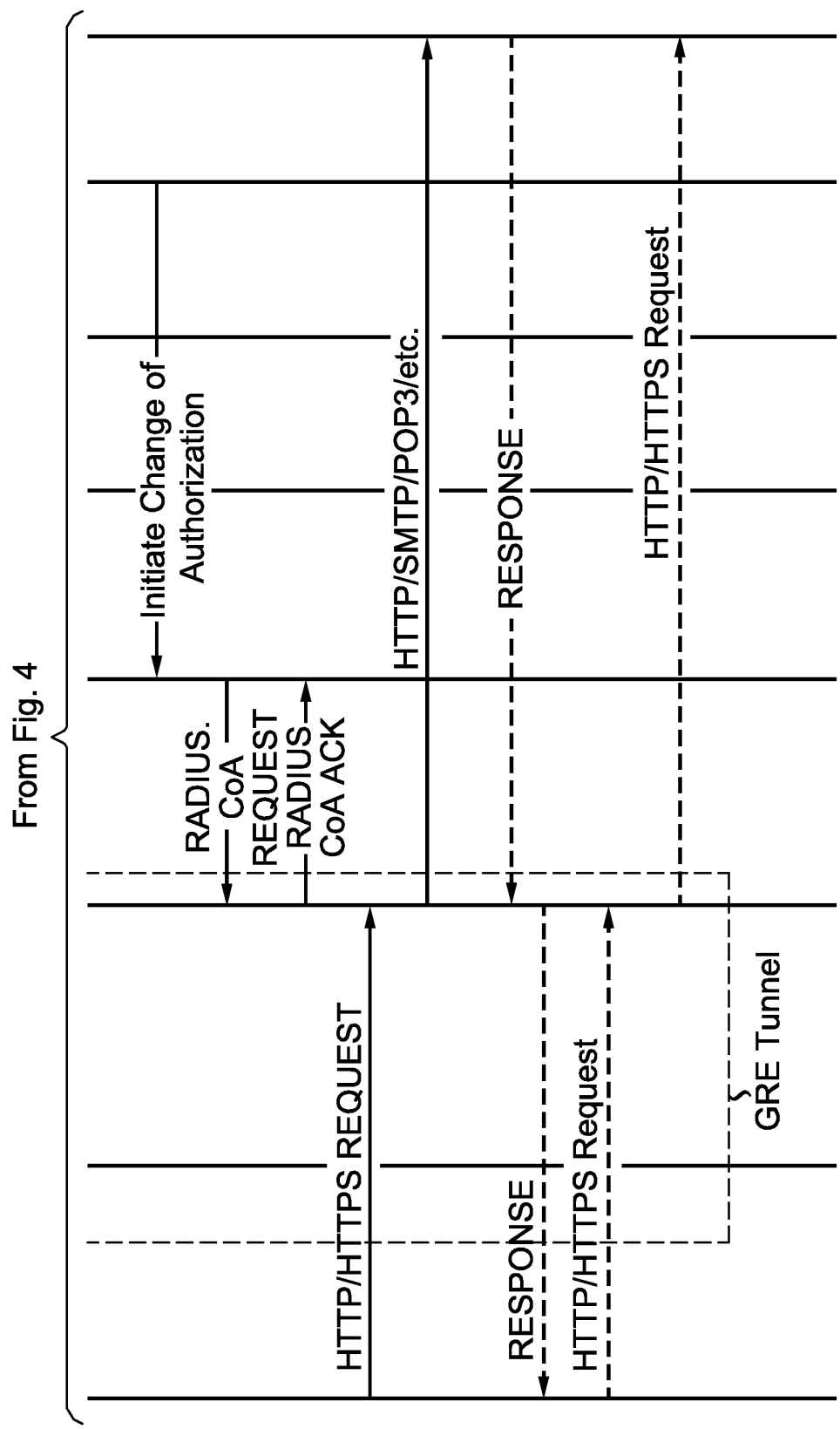
Figure 5:
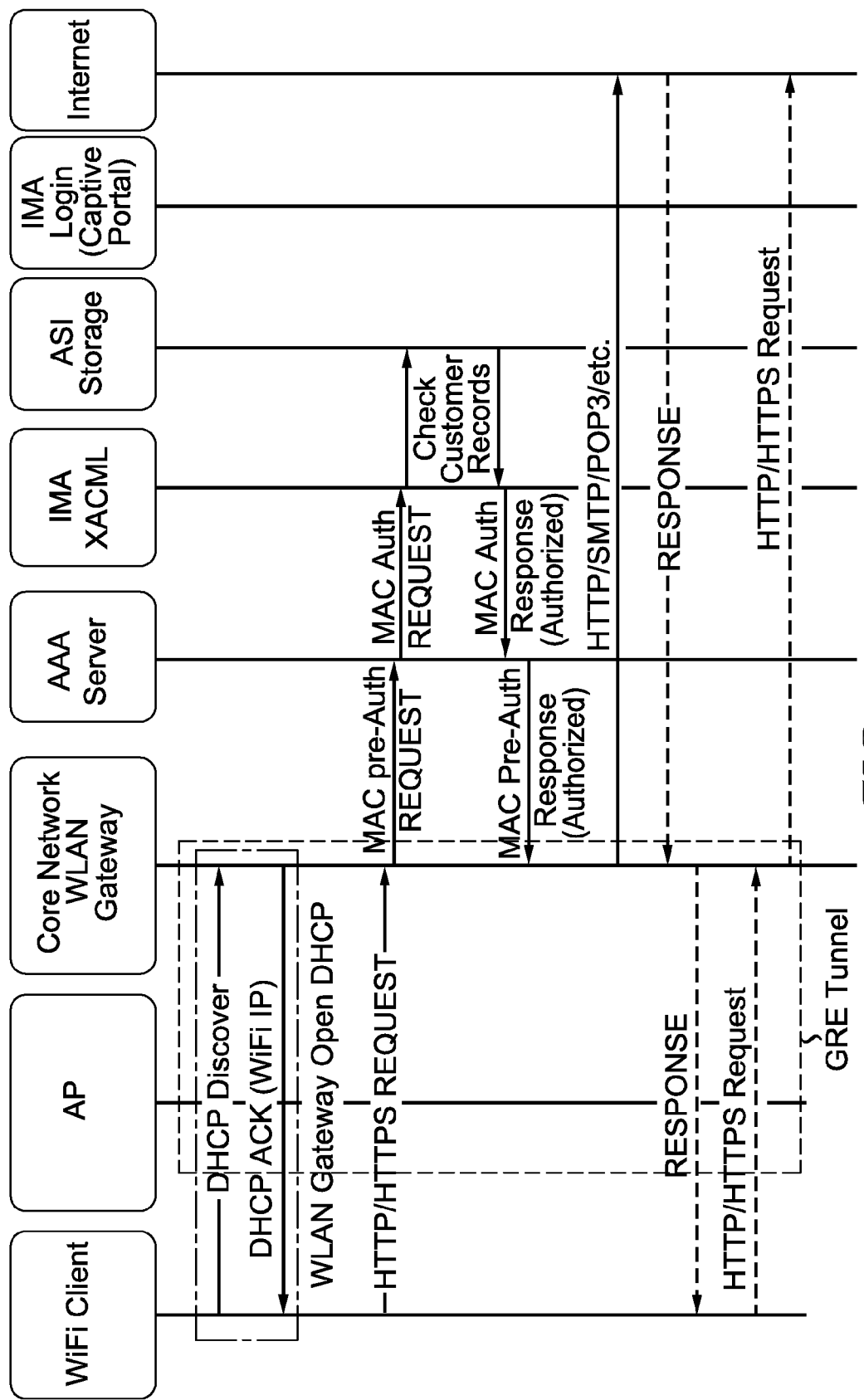
FIG. 5 shows a subsequent (prior-authenticated) user authentication with a fully GRE tunneled system in accordance with the principles of the present invention.

FIGS. 4 and 5 show a system where IP addresses are issued by the DHCP at the core network WLAN gateway. Here, deeper incursions into the core network are minimized by issuing IP addresses without authentication, and commencing with authentication after the client requests access to the core network. Alternately, the authentication could proceed during a period of lower activity detected by the gateway, or at the request of the core authentication servers. If the number of IP addresses available is limited, this feature can be limited (reserving a limited pool of addresses for this unauthenticated assignment) or DHCP lease time can be minimized, allowing for quick expiration of leases of migrant users. Authenticated users can be given a longer DHCP lease time. The lease time is the length of time that the allocated IP address is valid. Upon disconnecting, the allocated IP address is returned to the IP address pool for use by another user device (client device). Thus, if the user is truly migrant and does not request access to the core network then the allocated IP address is released quickly with no authentication by the core network, which reduces core traffic on the network. IP addresses can be allocated in one of three ways: dynamically, statically or automatically. In the present invention, IP addresses from the pool are allocated dynamically.

FIG. 4 shows first time user authentication with a fully GRE tunneled system in accordance with the principles of the present invention. The WiFi client (user device, client device) broadcasts (transmits, forwards, sends) a DHCP discover message (request) to the core network WLAN GW via the GRE tunnel. The core network WLAN GW responds with a DHCP ACK and an IP address issued from the IP address pool. In addition to the IP address, the core network WLAN GW transmits (sends, forwards) a lease time and may also forward (transmit, send) other IP configuration parameters. Assuming that the user device (client device) attempts to access the core network by transmitting a HTTP/HTTPS request, then the user device (client device) is authenticated at the time the user attempts to access the network for services. The HTTP/HTTPS request message is transmitted to the core network WLAN GW, which transmits (forwards, sends) a MAC pre-authentication request to the AAA server. The AAA server forwards (transmits, sends) a MAC authentication request to the IMA XACML. The IMA XACML forwards (transmits, sends) a request to the ASI to check customer records. The ASI responds (replies) to the IMA XACML. The IMA XACML sends (transmits, forwards a MAC authentication response to the AAA server over a captive portal. The AAA server sends (transmits, forwards) a MAC pre-authentication response to the core network WLAN GW over a captive portal. The core network WLAN GW transmits (forwards, sends) a HTTP/HTTPS 302 redirect message to the user device (client device) via the GRE tunnel. The user device (client device) is redirected to a captive portal URL (HTTPS). Using a captive portal forces the user device (client device) to see a special web page for authentication purposes before using the Internet normally. The web page to which the user device (client device) is redirected is configurable. The user device (client device) is redirected to the IMA login captive portal. The login page is displayed at the user device (client device). The user device responds by form post to the IMA login page. Form post is transmission of information (data) via HTTP(S). The form post includes data (information) such as user identification (user id) and password. This may be entered manually by the user or automatically by the user device (client device, WiFi client). The IMA login page responds by with a 302 redirect (HTTPS) to the user device (client device). The 302 redirect (HTTPS) is sent to the user device upon authentication of the user device (client device). The IMA login then initiates a Change of Authorization (CoA) to the AAA server. The AAA server sends (forwards, transmits) a Remote Authentication Dial In User Service (RADIUS) CoA request to the core network WLAN GW. RADIUS is a networking protocol that provides AAA management for client devices (user devices) to access and use network services. The core network WLAN GW responds to the AAA server with a RADIUS CoA ACK. The user device (client device) sends (transmits, forwards) a HTTP/HTTP request to the core network WLAN GW via the GRE tunnel. The core network WLAN GW forwards (transmits, sends) the HTTP/SMTP/POP3 request (message) to the Internet (if the user device has been authenticated). Once the user has been authenticated and authorized, access to the Internet is provided directly through the core network WLAN gateway.

FIG. 5 shows a subsequent (prior-authenticated) user authentication with a fully GRE tunneled system in accordance with the principles of the present invention. A WiFi client (user device, client device) engages in an open DHCP exchange with the core network WLAN GW. The includes a DHCP discover request message from the WiFi client (user device, client device) to the core network WLAN GW, which responds with a DHCP ACK. A WiFi client (user device, client device) which has been previous authenticated sends (transmits, forwards) a HTTP/HTTPS request to the core network WLAN GW via the GRE tunnel. The core network WLAN GW sends (transmits, forwards) a MAC pre-authentication request to the AAA server. The AAA server forwards (transmits, sends) a MAC authentication request to the IMA XACML. The IMA XACML forwards (transmits, sends) a request to the ASI to check customer records. The ASI responds (replies) to the IMA XACML. The IMA XACML sends (transmits, forwards) a MAC authentication response indicating that the user device (client device) is authorized to the AAA server. The AAA server sends (transmits, forwards) a MAC pre-authentication response indicating that the user device (client device) is authorized to the core network WLAN GW. The core network WLAN GW forwards (sends, transmits) the HTTP/SMTP/POP3 request (message) to the Internet (if the user device has been authenticated). As can be seen if the user device has been previously authenticated the redirection in order to authenticate the user portion of FIG. 4 is omitted, and subsequent traffic is exchanged to and from the core network WLAN GW to the Internet.

Figure 6:
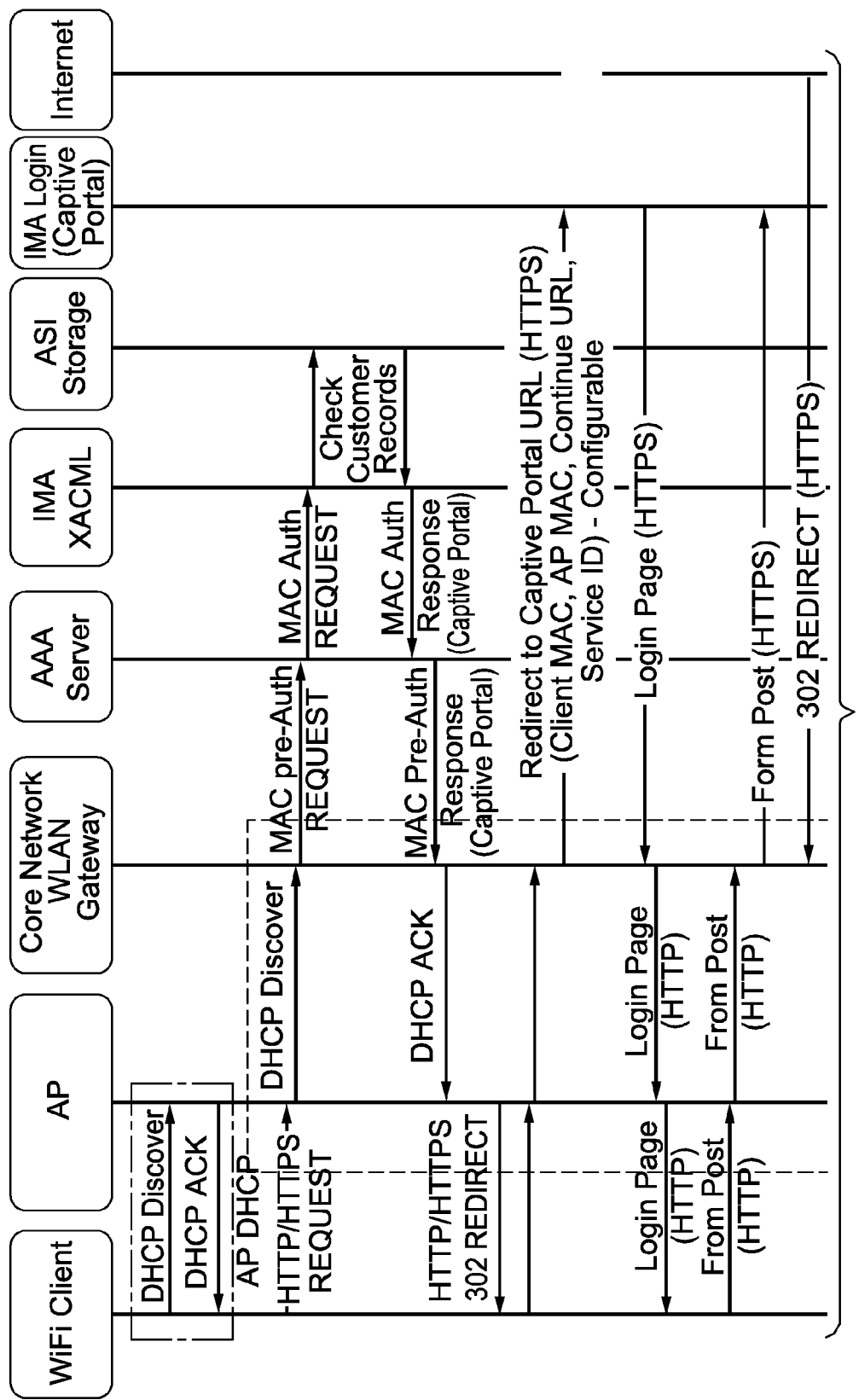
FIG. 6 shows first time user authentication with AP DHCP in accordance with the principles of the present invention.
Figure 6:
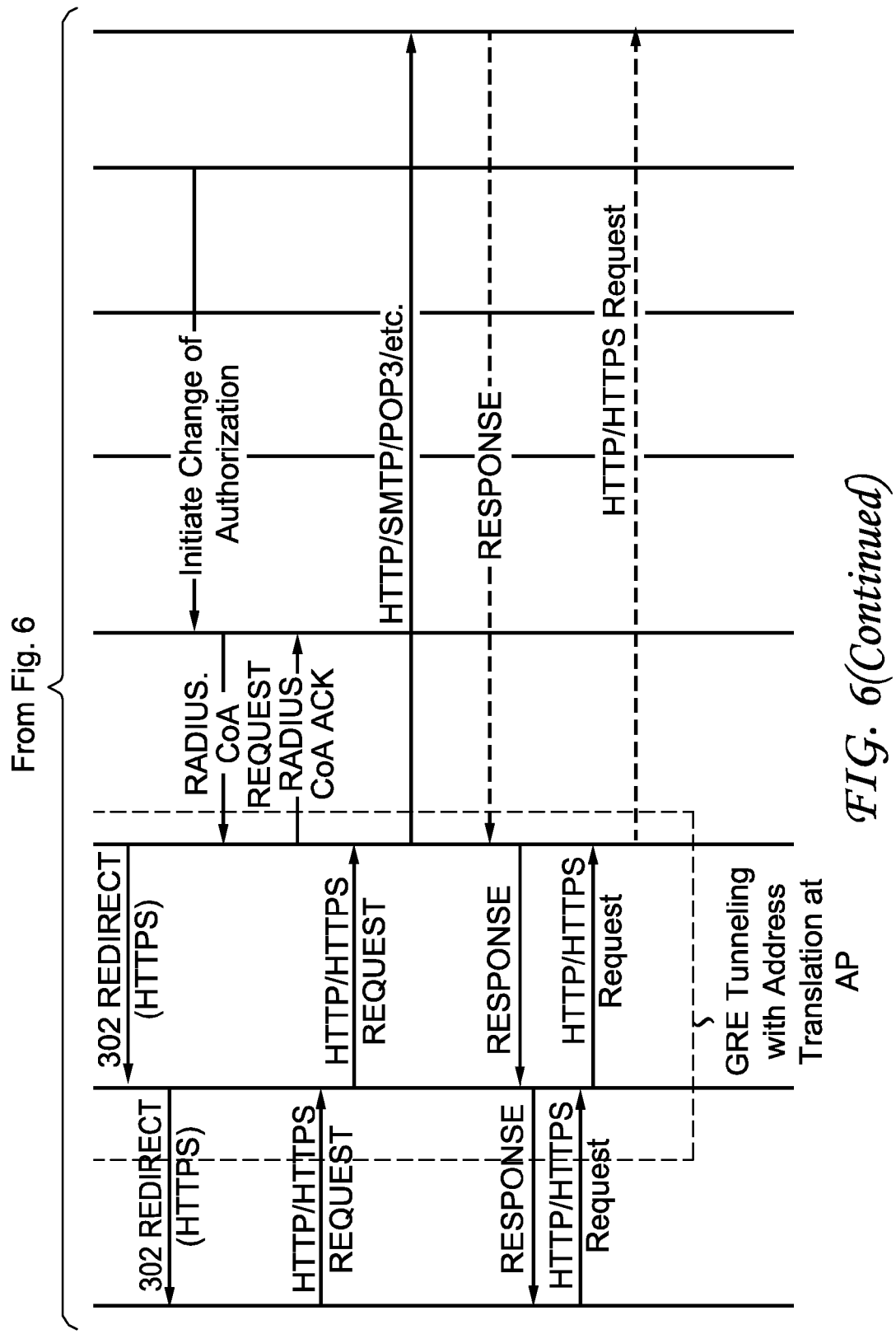
Figure 7:
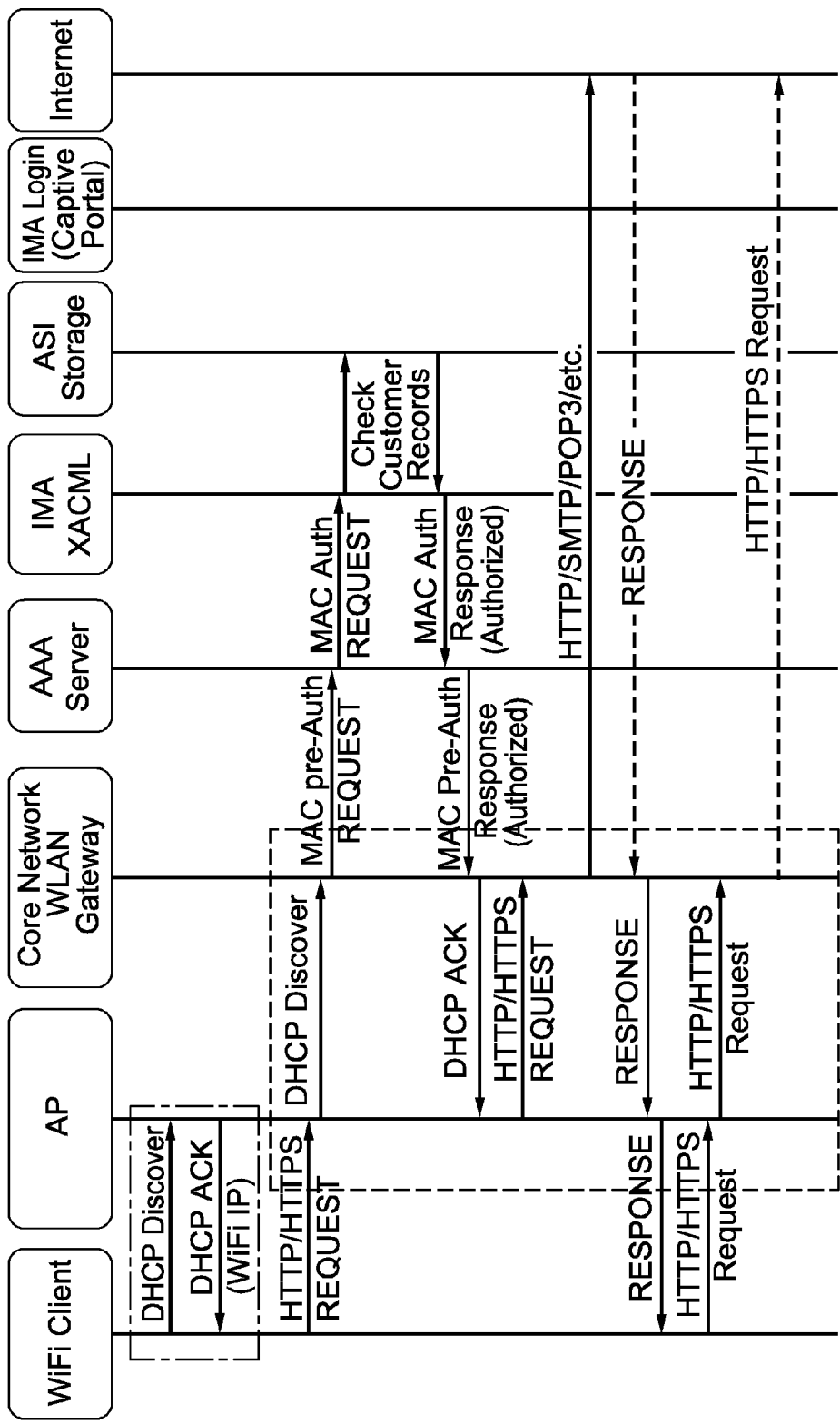
FIG. 7 shows authentication for pre-authorized users with AP DHCP in accordance with the principles of the present invention.

FIGS. 6 and 7 are an alternative embodiment of the present invention and illustrate where the AP issues IP addresses. The AP will only access the WLAN gateway core network if the user requests network access. The authentication process is started at that point, and the AP will perform address translation from the IP address it issued (unless there are a sufficient number of IP addresses for the AP to control given from the WLAN gateway in advance) to the IP address given by the WLAN gateway. This increases the load on the AP and latency of the network, but it minimizes the load on the core network, by not even notifying it about migrant users who do not request network services.

FIG. 6 shows first time user authentication with AP DHCP in accordance with the principles of the present invention. The WiFi client (user device, client device) broadcasts a DHCP discover request (message) to locate any AP in the area that is part of the network to which the user subscribes or to a network with which the user's service provider has a roaming agreement. One or more APs may respond. An AP is selected based on best signal or loading or some other criteria. The selected AP replies (responds) with a DHCP ACK. If the WiFi client (user device, client device) then attempts to access the core network by transmitting a HTTP/HTTPS request, then the user device (client device) is authenticated. The HTTP/HTTPS request message is transmitted to the AP, which transmits a DHCP discover request (message) to the core network WLAN GW via the GRE tunnel. The core network WLAN GW transmits (forwards, sends) a MAC pre-authentication request to the AAA server. The AAA server forwards (transmits, sends) a MAC authentication request to the IMA XACML. The IMA XACML forwards (transmits, sends) a request to the ASI to check customer records. The ASI responds (replies) to the IMA XACML. The IMA XACML sends (transmits, forwards a MAC authentication response to the AAA server over a captive portal. The AAA server sends (transmits, forwards) a MAC pre-authentication response to the core network WLAN GW over a captive portal. The core network WLAN GW transmits (forwards, sends) a DHCP ACK to the AP, which transmits (sends, forwards) a HTTP/HTTPS redirect message to the user device (client device) via the GRE tunnel. The user device (client device) is redirected to a captive portal URL (HTTPS). Using a captive portal forces the user device (client device) to see a special web page for authentication purposes before using the Internet normally. The web page to which the user device (client device) is redirected is configurable. The user device is in communication with the AP, which performs address translation of the IP address that it issued to the WiFi client (user device, client device). That is, the AP receives all transmissions to/from the client and directs the transmissions to/from the core network WLAN GW, which in turn routes to the IMA login, the AAA server, the core network WLAN GW and the Internet (if authorized). The user device (client device) is redirected by the AP to the IMA login captive portal via the core network WLAN GW. The login page is forwarded to the AP which forwards the login page to the WiFi client (user device, client device) to be displayed at the user device (client device). The user device responds by form post to the IMA login page via the AP and core network WLAN GW. The form post includes data (information) such as user identification (user id) and password. This may be entered manually by the user or automatically by the user device (client device, WiFi client). The IMA login page responds by with a 302 redirect (HTTPS) to the user device (client device) via the AP and core network WLAN GW. The 302 redirect (HTTPS) is sent to the user device upon authentication of the user device (client device). The IMA login then initiates a Change of Authorization (CoA) to the AAA server. The AAA server sends (forwards, transmits) a Remote Authentication Dial In User Service (RADIUS) CoA request to the core network WLAN GW. RADIUS is a networking protocol that provides AAA management for client devices (user devices) to access and use network services. The core network WLAN GW responds to the AAA server with a RADIUS CoA ACK. The user device (client device) sends (transmits, forwards) a HTTP/HTTP request to the AP, which forwards the HTTP/HTTPS request to the core network WLAN GW via the GRE tunnel. The core network WLAN GW forwards (transmits, sends) the HTTP/SMTP/POP3 request (message) to the Internet (if the user device has been authenticated). Subsequent Internet accesses are performed by traversing the route to and from the WiFi client, AP, and core network WLAN GW to and from the Internet.

FIG. 7 shows authentication for pre-authorized users with AP DHCP in accordance with the principles of the present invention. A WiFi client (user device, client device) engages in a DHCP exchange with the AP with which it is associated. This includes a DHCP discover request message from the WiFi client (user device, client device) to the AP, which responds with a DHCP ACK. A WiFi client (user device, client device) which has been previous authenticated sends (transmits, forwards) a HTTP/SMTP/POP3 request (message) to the AP, which transmits (sends, forwards) a DHCP discover request (message) to the core network WLAN GW. The core network WLAN GW sends (transmits, forwards) a MAC pre-authentication request to the AAA server. The AAA server forwards (transmits, sends) a MAC authentication request to the IMA XACML. The IMA XACML forwards (transmits, sends) a request to the ASI to check customer records. The ASI responds (replies) to the IMA XACML. The IMA XACML sends (transmits, forwards a MAC authentication response indicating that the user device (client device) is authorized to the AAA server. The AAA server sends (transmits, forwards) a MAC pre-authentication response indicating that the user device (client device) is authorized to the core network WLAN GW. The core network WLAN GW forwards (sends, transmits) a DHCP ACK to the AP. Thereafter, the AP forwards the user's internet request or message, HTTP/SMTP/POP3 or other protocol for example, to the Internet (if the user device has been authenticated) via the core network WLAN GW. As can be seen if the user device has been previously authenticated the redirection in order to authenticate the user portion of FIG. 6 is omitted. Subsequent Internet accesses are performed by traversing the route to and from the WiFi client, AP, and core network WLAN GW to and from the Internet.

TABLE 1

Key Differences between Approaches

| Tradeoffs | Latency | AP Implementation | Core Network Utilization | IP address utilization |
|---|---|---|---|---|
| Original approach | Low | GRE tunneling alone | Every WiFi activity | Only authenticated users issued addresses |
| WLAN Gateway Approach | Low | GRE tunneling alone | WLAN Gateway filters core network activity to actual network requests | Unauthenticated users issued short lease addresses |
| AP Approach | Increased due to AP processing | Increased complexity for address translation | AP administers DHCP, WLAN gateway and core network activity limited to actual network requests | Unauthenticated users issued short lease addresses from AP, core network addresses preserved for authenticated users |

One of the design considerations will be the availability of IP addresses. The original approach conserved these addresses by only giving DHCP leases to authenticated users. The WLAN gateway approach shares a pool of addresses among a number of access points. Here, the addresses are more precious than in the AP approach, where each access point will serve addresses, and map them to the limited number of WLAN Gateway addresses connecting the core network.

Considerations for Implementation:
1) Short initial DHCP lease time: Before authentication, keep the lease time to a minimum. This may require frequent DHCP renewals, but it would not bother the core network. This way, if authentication failed on a client, the address occupied by the client (user device, client device, WiFi client) would be freed up quickly. Once authenticated, the lease time could be increased.
2) The AP approach is implemented entirely in the AP. Good for AP vendor since the AP would control the software, but may be a burden on the system as the number of public WiFi clients increase.
3) The WLAN gateway approach needs to be implemented by a gateway vendor or service provider. The WLAN GW approach is transparent to the AP design.
4) Original authentication approach should be re-employed if it is suspected that the system is under a Denial of Service (DoS) attack.
5) If DHCP pool IP addresses are getting scarce, reverting to the original authentication approach is desirable.

From the WiFi client (user device, client device) perspective, there is no discernible difference between the conventional approach, the core network WLAN GW approach and the AP approach. The same messages are sent and received. The difference is to/from which entity the messages are transmitted/received. That is, for example, the WiFi client (user device, client device) still sends a DHCP request and still receives a DHCP ACK. In the conventional approach, the DHCP request/DHCP response is sent to/from the WLAN GW. In the core network WLAN GW approach, the DHCP request/DHCP response is sent to/from the core network WLAN GW. In the AP approach, the DHCP request/DHCP response is sent to/from the AP. The differences in approach are transparent to the WiFi client (user device, client device)

It should be clear from the above description and the corresponding figures that the acting entities (WLAN GW (AAA proxy) in a conventional system, the core network WLAN GW and the AP) and order of the interactions with the AAA server and the IMA login are critical.

Figure 8A:
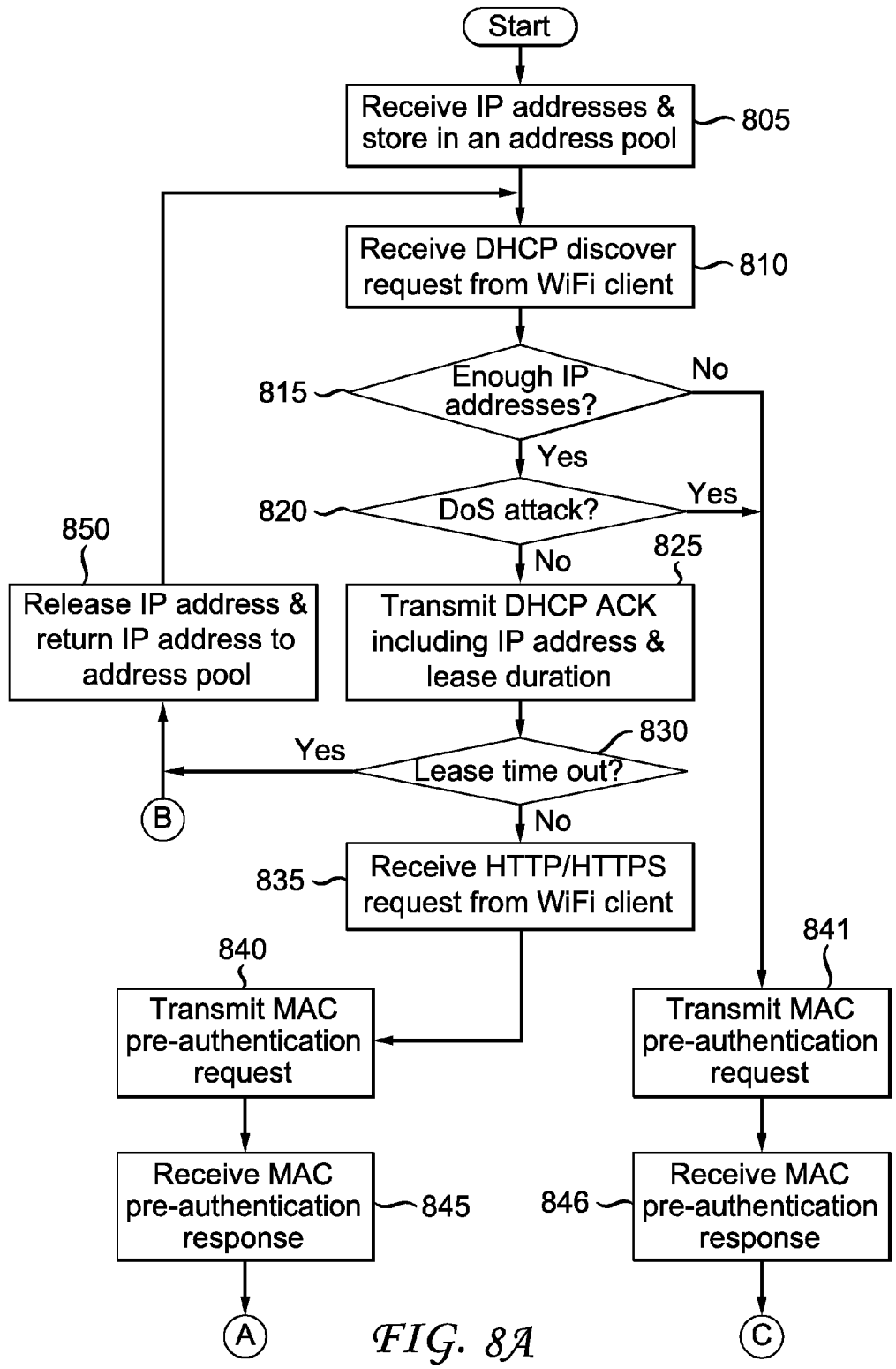
FIGS. 8A and 8B together form a flowchart of the operation of a core network WLAN GW in accordance with the principles of the present invention.
Figure 8B:
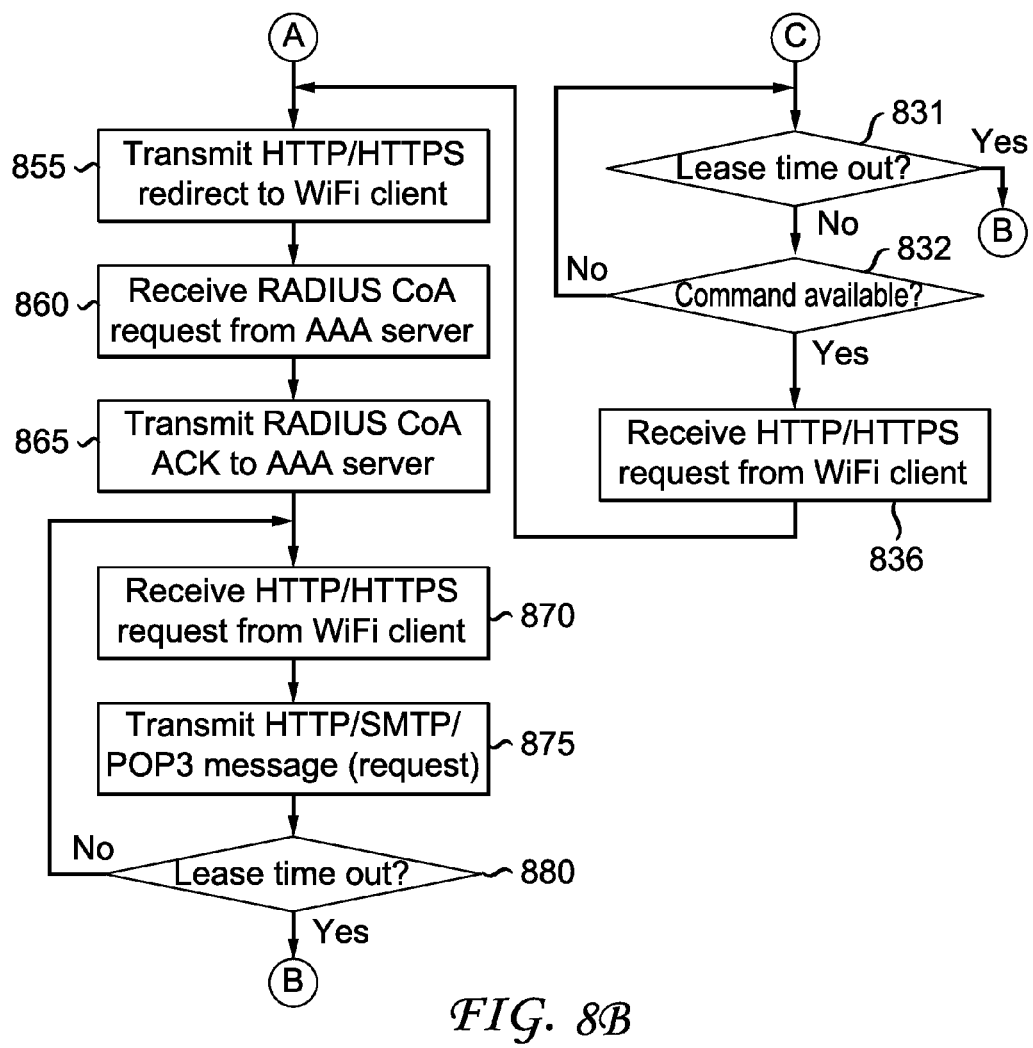

FIGS. 8A and 8B together form a flowchart of the operation of a core network WLAN GW in accordance with the principles of the present invention. At 805, the core network WLAN GW receives a number of IP addresses from the Internet Service Provider (ISP) and stores them in an address pool for issuance. The storage may be any form of storage and is not limited to any particular form of storage. At 810, the core network WLAN GW receives a DHCP discover request from a WiFi client (user device, client device). At 815, the core network WLAN GW performs a test to determine if the core network WLAN GW has enough IP addresses available in the IP address pool to issue an IP address to the WiFi client. If the core network WLAN GW has enough IP addresses in the IP address pool to issue to the WiFi client then the core network WLAN GW performs a test at 820 to determine if a Denial of Service (DoS) attack is suspected. If a DoS attack is not suspected then at 825, the core network WLAN GW transmits a DHCP ACK including an IP address and lease information to the WiFi client. At 830, the core network WLAN GW performs a test to determine if the lease time for the IP address has expired. If the lease time for the IP address has not expired then at 835 the core network WLAN GW receives a HTTP/HTTPS request from the WiFi client. At 840, the core network WLAN GW transmits a MAC Pre-authentication request to the AAA server. At 845, the core network WLAN GW receives a MAC pre-authentication response from the AAA server. If the lease time for the IP address has expired then at 850, the core network WLAN GW releases the IP address and returns it to the IP address pool and processing proceeds to 810. If there were not enough IP addresses in the IP address pool or a DoS attack was suspected then processing proceeds to 841, where the core network authentication/authorization process is started before receipt of an internet access request by the WiFi client. At 836, when an Internet access request occurs, it is redirected to the captive portal at 855. While waiting for a command at 832, the lease timeout is also checked, and in the event of timeout, processing proceeds to 850.

At 855, the core network WLAN GW transmits a HTTP/HTTPS redirect message to the WiFi client. At 860, the core network WLAN GW receives a RADIUS Change of Authorization (CoA) from the AAA server. At 865 the core network WLAN GW transmits a RADIUS CoA ACK to the AAA server. At 870 the core network WLAN GW receives a HTTP/HTTPS request from the WiFi client. At 875 the core network WLAN GW transmits a HTTP/SMTP/POP3 message to the Internet 870 and 875 illustrate the user's interaction with the Internet, which can continue until the DHCP lease times out at 880 or until the user moves out of range of the current access point. If the DHCP lease times out, the processing proceeds to 850, then to 810, where the core network WLAN gateway waits for a DHCP discover from a WiFi client. A client may transmit a request to renew the DHCP lease before it expires per IETF RFC 2131 to avoid the timeout.

Figure 9A:
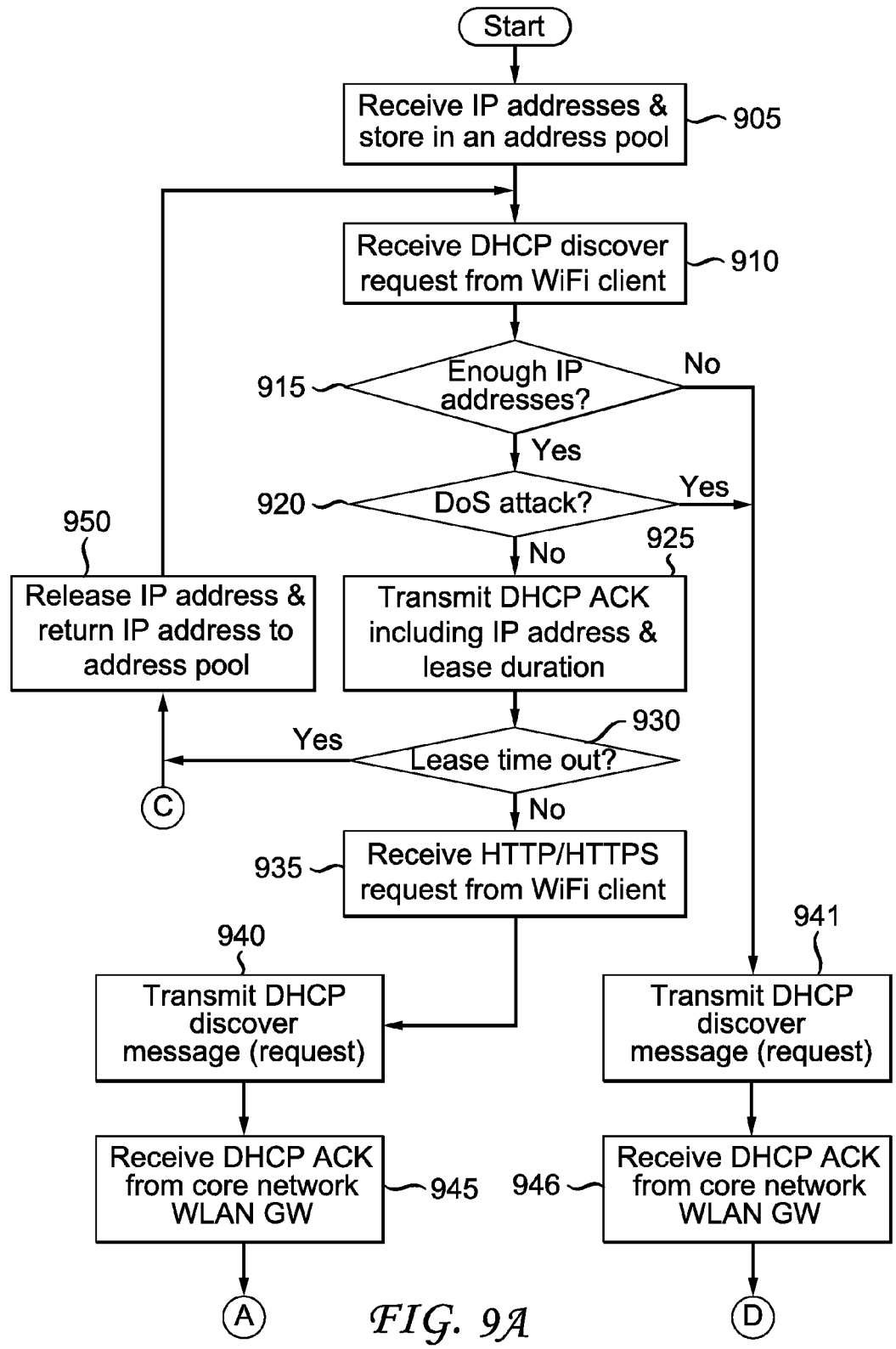
FIGS. 9A, 9B and 9C together form a flowchart of the operation of an AP in accordance with the principles of the present invention.
Figure 9B:
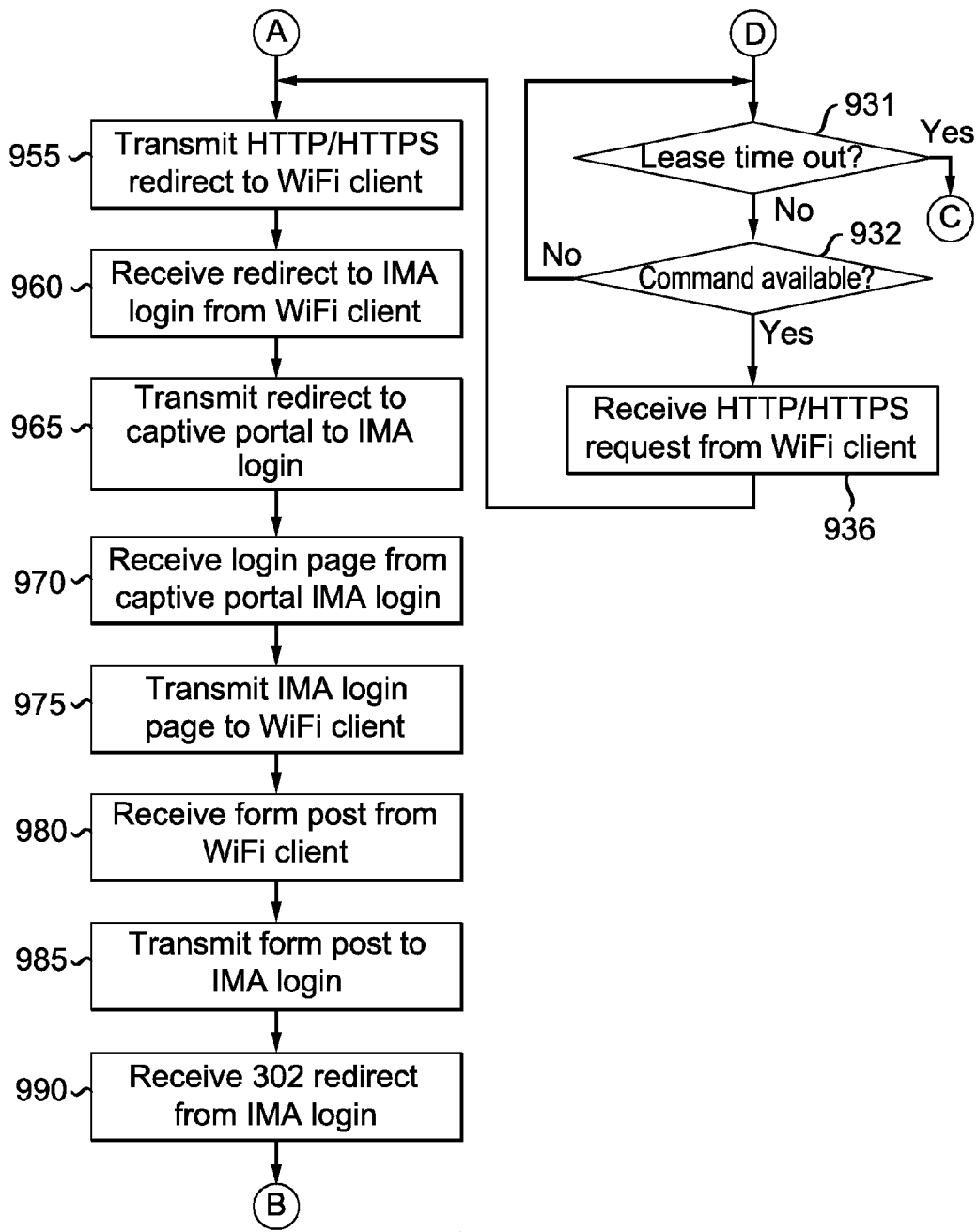
Figure 9C:
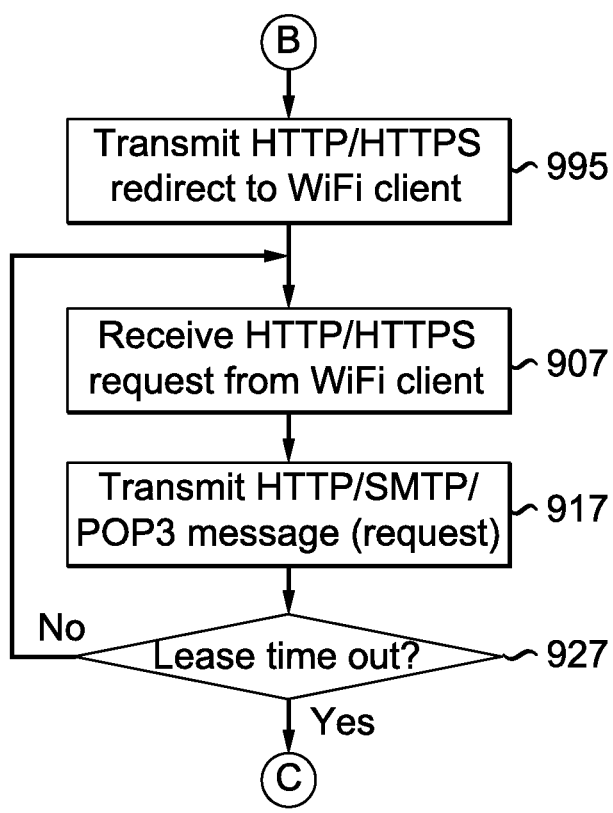

FIGS. 9A, 9B and 9C together form a flowchart of the operation of an AP in accordance with the principles of the present invention. The AP performs address translation and controls the processing in this approach. At 905, the AP receives a number of IP addresses from the Internet Service Provider (ISP) and stores them in an address pool for issuance. The storage may be any form of storage and is not limited to any particular form of storage. Alternately, the AP could just receive the number of possible WAN (Wide Area Network) connections, and operate as a secondary router in the network. At 910, the AP receives a DHCP discover request from a WiFi client (user device, client device). At 915, the AP performs a test to determine if the AP has enough IP addresses available in the IP address pool to issue an IP address to the WiFi client. If the AP has enough IP addresses in the IP address pool to issue to the WiFi client then the AP performs a test at 920 to determine if a Denial of Service (DoS) attack is suspected. If a DoS attack is not suspected then at 925, the AP transmits a DHCP ACK including an IP address and lease information to the WiFi client. At 930, the AP performs a test to determine if the lease time for the IP address has expired. If the lease time for the IP address has not expired then at 935 the AP receives a HTTP/HTTPS request from the WiFi client. At 940, the AP transmits a DHCP discover request (message) to the core network WLAN GW. At 945, the AP receives a DHCP ACK from the core network WLAN GW. If the lease time for the IP address has expired then at 950, the core network WLAN GW releases the IP address and returns it to the IP address pool and processing proceeds to 910. If there were not enough IP addresses in the IP address pool or a DoS attack was suspected then processing proceeds to 941, requesting a core network DHCP address without waiting for an access request (HTTP/HTTPS) from the WiFi client. After receiving the DHCP ACK from the core network WLAN gateway (946), processing waits for an access request from the WiFi client (932), while checking the status of the DHCP lease (931). Upon receipt of the access request (936), flow continues at 955. At 955, the AP transmits HTTP/HTTPS redirect to the WiFi client. At 960 the AP receives a redirect to the IMA login from the WiFi client. At 965, the AP transmits a redirect to the captive portal to the IMA login. At 970, the AP receives a login page from the IMA login. At 975, the AP transmits the IMA login page to the WiFi client. At 980 the AP receives an Identification (User Id) from the WiFi client. The form post includes, for example, the User Identification (User Id) and password of the WiFi client. At 985, the AP transmits the form post to the IMA login. At 990, the AP receives a 302 redirect from the IMA login.

At 995, the AP transmits a HTTP/HTTPS redirect message to the WiFi client. At 907, the AP receives a HTTP/HTTPS request from the WiFi client. At 917 the AP transmits a HTTP/SMTP/POP3 message to the Internet. At this point the WiFi client is connected to the Internet, and can continue operation until the DHCP lease times out in 927, where processing proceeds to 950, and a new lease can be obtained. A client may transmit a request to renew the DHCP lease per IETF RFC 2131.

Figure 10:
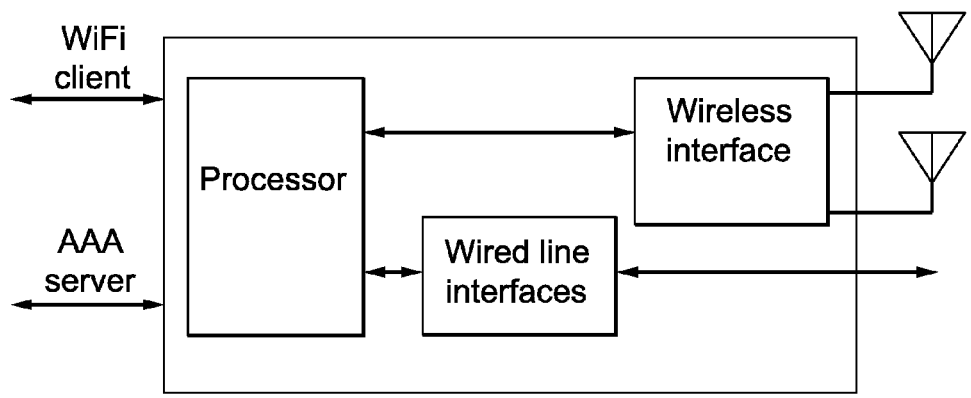
FIG. 10 is a block diagram of an exemplary core network WLAN GW of the present invention.

FIG. 10 is a block diagram of the core network WLAN GW. The core network WLAN GW is in communication with the WiFi client (user device, client device), the AAA server and the Internet. Communications may be wired line or wireless. The WiFi client (user device, client device) sends requests (messages) to the core network WLAN GW and receives responses (messages) from the core network WLAN GW. The core network WLAN GW is also in communication with the AAA server in order to authenticate and authorize the WiFi client (user device, client device). The core network WLAN GW is also in communication with the Internet to forward requests (messages) of the WiFi client (user device, client device) if and/or when the WiFi client is authenticated and authorized. Processing of all requests, responses (message) is handled by the processing module. The processing module may also interface with storage of any form. The processing module may also be (include) hardware, software, firmware, application specific integrated circuits (ASICs), Reduced Instruction Set Computers (RISCs) and/or Field Programmable Gate Arrays (FPGAs) as well as displays, and additional input/output devices such as printers. The wireless interface communicates via one or more antennas. The means for receiving a plurality of internet protocol (IP) addresses from a dynamic host configuration protocol (DHCP) server is via either the wired line interfaces or the wireless interfaces depending on how the DHCP server is communicating. The means for storing the received plurality of IP addresses is storage (not shown) that is accessed by the processor. The means for receiving a DHCP discover request from a wireless client device is via the wireless interfaces. The means for determining if there are enough IP addresses available to assign one of the plurality of IP addresses to the wireless client device is performed by the processor. The means for transmitting a DHCP acknowledgement including the assigned IP address and a lease duration to the wireless client device is via the wireless interfaces. The means for determining if a lease timeout has occurred is performed by the processor. The means for releasing the assigned IP address if the lease timeout has occurred is performed by the processor. The means for receiving a first hypertext transfer protocol (HTTP) request or a first hypertext transfer protocol secure (HTTPS) request from the wireless client device is via the wireless interfaces. The means for transmitting a media access control (MAC) pre-authentication request from the wireless client to an authentication, authorization and accounting (AAA) server is via either the wireless interfaces or the wired line interfaces depending on how the AAA server is communicating. The means for receiving a MAC pre-authentication response from the AAA server is via either the wireless interfaces or the wired line interfaces depending on how the AAA server is communicating. The means for providing access to the Internet via the wireless client device is via the wireless interfaces.

Figure 11:
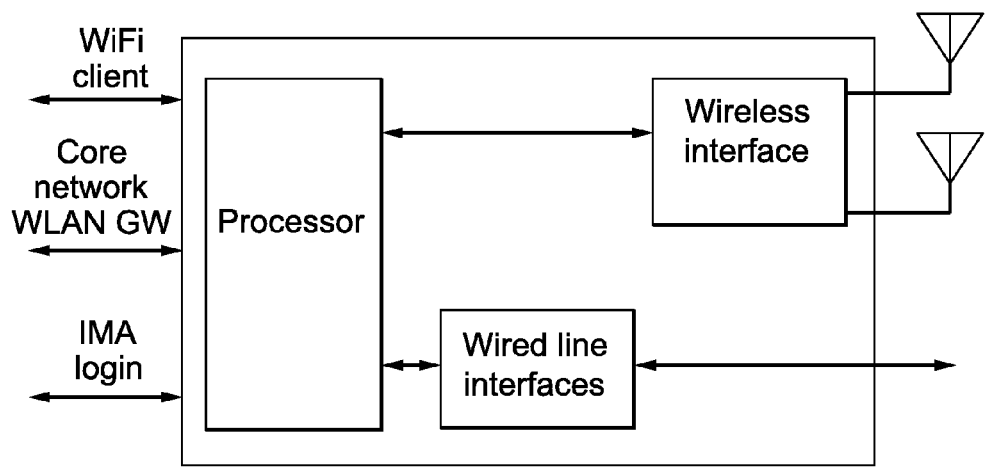
FIG. 11 is a block diagram of an exemplary AP of the present invention.

FIG. 11 is a block diagram of an exemplary AP of the present invention. The AP is in communication with the WiFi client (user device, client device), the core network WLAN GW and the IMA login. Communications may be wired line or wireless. The WiFi client (user device, client device) sends requests (messages) to the AP and receives responses (messages) from the AP. The AP is also in communication with the IMA login to authenticate and authorize the WiFi client (user device, client device). Processing of all requests, responses (message) is handled by the processing module. The processing module may also interface with storage of any form. The processing module may also be (include) hardware, software, firmware, application specific integrated circuits (ASICs), Reduced Instruction Set Computers (RISCs) and/or Field Programmable Gate Arrays (FPGAs) as well as displays, and additional input/output devices such as printers. The wireless interface communicates via one or more antennas. The means for receiving a plurality of internet protocol (IP) addresses from a dynamic host configuration protocol (DHCP) server is via either the wired line interfaces or the wireless interfaces depending on how the DHCP server is communicating. The means for storing the received plurality of IP addresses is storage (not shown) that is accessed by the processor. The means for receiving a DHCP discover request from a wireless client device is via the wireless interfaces. The means for determining if there are enough IP addresses available to assign one of the plurality of IP addresses to the wireless client device is performed by the processor. The means for transmitting a DHCP acknowledgement including the assigned IP address and a lease duration to the wireless client device is via the wireless interfaces. The means for determining if a lease timeout has occurred is performed by the processor. The means for releasing the assigned IP address if the lease timeout has occurred is performed by the processor. The means for receiving a first hypertext transfer protocol (HTTP) request or a first hypertext transfer protocol secure (HTTPS) request from the wireless client device is via the wireless interfaces. The means for transmitting a media access control (MAC) pre-authentication request from the wireless client to an authentication, authorization and accounting (AAA) server is via either the wireless interfaces or the wired line interfaces depending on how the AAA server is communicating. The means for receiving a MAC pre-authentication response from the AAA server is via either the wireless interfaces or the wired line interfaces depending on how the AAA server is communicating. The means for providing access to the Internet via the wireless client device is via the wireless interfaces.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed Given the teachings herein, one of ordinary skill in the related art will be able to contemplate these and similar implementations or configurations of the present invention.

The invention claimed is:

1. A method for reducing core network traffic caused by migrant users of a public wireless network, said method comprising:
  receiving a plurality of internet protocol (IP) addresses from a dynamic host configuration protocol (DHCP) server;
  storing said received plurality of IP addresses;
  receiving a DHCP discover request from a wireless client device;
  determining if there are enough IP addresses available to assign one of said plurality of IP addresses to said wireless client device when there are enough IP addresses available to assign;
  transmitting a DHCP acknowledgement including said assigned IP address and a lease duration to said wireless client device, said lease duration providing a time period within which said wireless client device may request access to the core network;
  determining if a first lease timeout has occurred without said wireless client device requesting access to the core network;
  releasing said assigned IP address if said first lease timeout has occurred;
  receiving a first hypertext transfer protocol (HTTP) request or a first hypertext transfer protocol secure (HTTPS) request from said wireless client device;
  relaying a media access control (MAC) pre-authentication request from said wireless client to an authentication, authorization and accounting (AAA) server;
  receiving a media access control (MAC) pre-authentication response from said AAA server;
  providing access to the Internet via the wireless client device;
  determining if a denial of service (DoS) attack has occurred and upon determining a DoS attack has not occurred, relaying said MAC pre-authentication request from said wireless client to an authentication, authorization and accounting (AAA) server;
  receiving said MAC pre-authentication response from said AAA server;
  determining if said first lease timeout has occurred without said wireless client device requesting access to the core network;
  releasing said assigned IP address if said first lease timeout has occurred;
  determining if a command is available, if said first lease timeout has not occurred; and
  receiving an HTTP request or a HTTPS request from said wireless client device when said first lease timeout has not occurred and said command is available.

2. The method according to claim 1, further comprising:
  transmitting a hypertext transfer protocol (HTTP) 302 redirect message or a hypertext transfer protocol secure (HTTPS) 302 redirect message to said wireless client device;
  receiving a remote authentication dial in user service (RADIUS) change of authorization (CoA) from said AAA server; and
  transmitting a RADIUS CoA acknowledgment to said AAA server.

3. An apparatus for reducing core network traffic caused by:
  migrant users of a public wireless network, comprising:
  means for a communication interface receiving a plurality of internet protocol (IP) addresses from a dynamic host configuration protocol (DHCP) server, wherein said communication interface comprises a wired interface and a wireless interface;
  means for memory for storing said received plurality of IP addresses;
  means for said wireless interface receiving a DHCP discover request from a wireless client device;
  means for a hardware processor for determining if there are enough IP addresses available to assign one of said plurality of IP addresses to said wireless client device when there are enough IP addresses available to assign, said hardware processor in bi-directional communication with said wired interface and said wireless interface;
  means for said wireless interface transmitting a DHCP acknowledgement including said assigned IP address and a lease duration to said wireless client device, said lease duration providing a time period within which said wireless client device may request access to the core network;
  means for said hardware processor determining if a first lease timeout has occurred without said wireless client device requesting access to the core network;

means for said hardware processor releasing said assigned IP address if said first lease timeout has occurred;

means for said wireless interface receiving a first hypertext transfer protocol (HTTP) request or a first hypertext transfer protocol secure (HTTPS) request from said wireless client device;

means for said communication interface relaying a media access control (MAC) pre-authentication request from said wireless client to an authentication, authorization and accounting (AAA) server;

means for said communication interface receiving a media access control (MAC) pre-authentication response from said AAA server;

means for said communication interface providing access to the Internet via the wireless client device;

means for said hardware processor determining if a denial of service (DoS) attack has occurred;

means for said communication interface relaying said MAC pre-authentication request from said wireless client to an authentication, authorization and accounting (AAA) server upon determining said DoS attack has not occurred;

means for said communication interface receiving said MAC pre-authentication response from said AAA server;

means for said hardware processor determining if said first lease timeout has occurred without said wireless client device requesting access to the core network;

means for said hardware processor releasing said assigned IP address if said first lease timeout has occurred;

means for said hardware processor determining if a command is available if said first lease timeout has not occurred; and means for said wireless interface receiving a third HTTP request or a third HTTPS request from said wireless client device if said first lease timeout has not occurred and said command available.

4. The apparatus according to claim 3, further comprising:
means for said wireless interface transmitting a hypertext transfer protocol (HTTP) 302 redirect message or a hypertext transfer protocol secure (HTTPS) 302 redirect message to said wireless client device;

means for said communication interface receiving a remote authentication dial in user service (RADIUS) change of authorization (CoA) from said AAA server; and means for said communication interface transmitting a RADIUS CoA acknowledgment to said AAA server.

5. The method according to claim 1, further comprising:
transmitting a HTTP 302 redirect message or a HTTPS 302 redirect message to said wireless client device;
receiving a HTTP redirect command or a HTTPS redirect command from said wireless client device;
transmitting said HTTP redirect command or said HTTPS redirect command to a captive portal identity management architecture (IMA) processing system login;
receiving a login page from said captive portal IMA processing system login;
transmitting a IMA login page to said wireless client device;
receiving a form post from said wireless client device;
transmitting said form post to said captive portal IMA processing system login;
receiving a HTTP 302 redirect directive or a HTTPS 302 redirect directive from said captive portal IMA processing system login; and transmitting said HTTP 302 redirect directive or said HTTPS 302 redirect directive to said wireless client device.

6. The apparatus according to claim 3, further comprising:
means for said wireless interface transmitting a HTTP 302 redirect message or a HTTPS 302 redirect message to said wireless client device;
means for said wireless interface receiving a HTTP redirect command or a HTTPS redirect command from said wireless client device;
means for said communication interface transmitting said HTTP redirect command or said HTTPS redirect command to a captive portal identity management architecture (IMA) processing system login;
means for said communication interface receiving a login page from said captive portal IMA processing system login;
means for said wireless interface transmitting a IMA login page to said wireless client device;
means for said wireless interface receiving a form post from said wireless client device;
means for said communication interface transmitting said form post to said captive portal IMA processing system login;
means for said communication interface receiving a HTTP 302 redirect directive or a HTTPS 302 redirect directive from said captive portal IMA processing system login; and
means for said wireless interface transmitting said HTTP 302 redirect directive or said HTTPS 302 redirect directive to said wireless client device.

7. An apparatus for reducing core network traffic caused by migrant users of a public wireless network, comprising:
a communication interface for receiving a plurality of internet protocol (IP) addresses from a dynamic host configuration protocol (DHCP) server, said communication interface comprising a wired interface and a wireless interface, said wireless interface receiving a DHCP discover request from a wireless client device;

a memory for storing said received plurality of IP addresses;

a hardware processor for determining if there are enough IP addresses available to assign one of said plurality of IP addresses to said wireless client device when there are enough IP addresses available to assign, said hardware processor being in bi-directional communication with said wired interface and said wireless interface, wherein said wireless interface transmits a DHCP acknowledgement including said assigned IP address and a lease duration to said wireless client device, said lease duration providing a time period within which said wireless client device may request access to the core network, said hardware processor determines if a first lease timeout has occurred without said wireless client device requesting access to the core network and releases said assigned IP address if said first lease timeout has occurred, upon determining said first lease timeout has not occurred, wireless interface receives a first hypertext transfer protocol (HTTP) request or a first hypertext transfer protocol secure (HTTPS) request from said wireless client device; said communication interface relays a media access control (MAC) pre-authentication request from said wireless client to an authentication, authorization and accounting (AAA) server, receives a media access control (MAC) pre-authentication response from said AAA server and provides access to the Internet via the wireless client device;

said hardware processor determines if a denial of service (DoS) attack has occurred and upon determining a DoS attack has not occurred, said communication interface relaying said MAC pre-authentication request from said wireless client to an authentication, authorization and accounting (AAA) server and receives said MAC pre-authentication response from said AAA server, said hardware processor determines if said first lease timeout has occurred without said wireless client device requesting access to the core network, wherein said hardware processor releases said assigned IP address if said first lease timeout has occurred; and upon determining said first lease timeout has not occurred said hardware processor determines if a command is available and said wireless interface receives a third HTTP request or a third HTTPS request from said wireless client device if said command available.

8. The apparatus according to claim 7, wherein said wireless interface transmits a hypertext transfer protocol (HTTP) 302 redirect message or a hypertext transfer protocol secure (HTTPS) 302 redirect message to said wireless client device; and said communication interface receives a remote authentication dial in user service (RADIUS) change of authorization (CoA) from said AAA server and transmits a RADIUS CoA acknowledgment to said AAA server.

9. The apparatus according to claim 7, wherein said wireless interface transmits a HTTP 302 redirect message or a HTTPS 302 redirect message to said wireless client device and receives a HTTP redirect command or a HTTPS redirect command from said wireless client device;

said communication interface transmits said HTTP redirect command or said HTTPS redirect command to a captive portal identity management architecture (IMA) processing system login and receives a login page from said captive portal IMA processing system login;

said wireless interface transmits a IMA login page to said wireless client device and receives a form post from said wireless client device;

said communication interface transmits said form post to said captive portal IMA processing system login and receives a HTTP 302 redirect directive or a HTTPS 302 redirect directive from said captive portal IMA processing system login; and said wireless interface transmits said HTTP 302 redirect directive or said HTTPS 302 redirect directive to said wireless client device.

\* \* \* \* \*